(No Model.)
W. W. SIMRELL.
PIPE COUPLING.
No. 497,990. Patented May 23, 1893.
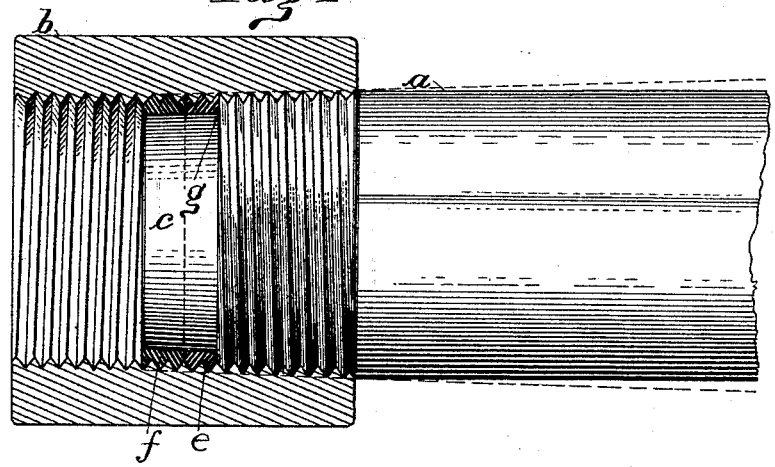
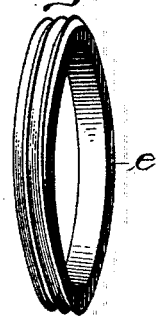
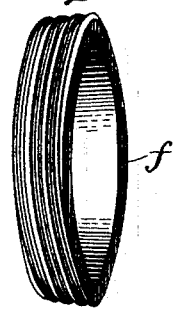
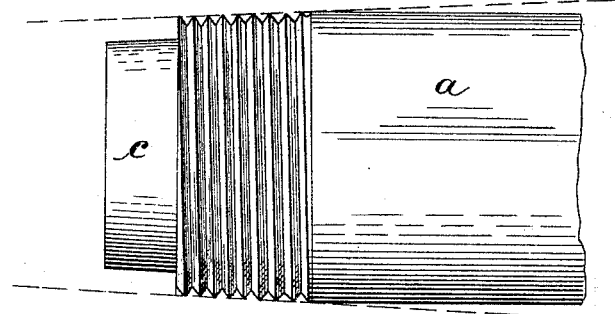
Witnesses
Inventor
William W. Simrell
Attorneys

United States Patent Office.

WILLIAM WALLACE SIMRELL, OF NEW YORK, N. Y.

PIPE-COUPLING.

SPECIFICATION forming part of Letters Patent No. 497,990, dated May 23, 1893.

Application filed December 31, 1892. Serial No. 456,887. (No model.)

*To all whom it may concern:*

Be it known that I, WILLIAM WALLACE SIMRELL, a citizen of the United States, residing at New York, in the county of New York and State of New York, have invented certain new and useful Improvements in Pipe-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in that class of pipe couplings or joints wherein a soft metal or material is employed to hermetically seal the joint.

My object is to provide a device which while containing all the advantages of the best sealed joint, can be applied with greater facility, convenience and cheapness.

To this end my invention consists in the peculiar features and combinations more fully described hereinafter and pointed out in the claim.

In the accompanying drawings, Figure 1, represents a longitudinal section through the center of a pair of pipe sections containing my improvements. Fig. 2 is an enlarged detail view of the packing ring. Fig. 3 is an enlarged detail view of the abutting ring. Fig. 4 is a view of the pipe section removed from the coupling sleeve, showing the plain extension in detail.

The reference letter $a$, represents an externally threaded section of metallic piping made slightly tapering. This section is adapted to fit into a coupling sleeve $b$, internally threaded to receive it. The end of section $a$, is reduced to form a blank or plain extension $c$, which acts as a mandrel or solid wall to receive the expansion of the packing. This packing consists of a ring $e$, composed of soft malleable or expansive material, preferably lead. It is externally threaded to engage the internal threads on the section $b$, and at the same time to fit snugly over the extension $c$. The reduction of the pipe section $a$, to form this plain extension thereon, leaves a shoulder $g$, which is opposed by a movable metallic ring $f$, externally threaded to screw into the interior of the pipe section. This ring is made substantially like the packing ring $e$, but is composed of harder metal such as brass. It is of a size which fits snugly over the blank extension of the pipe section $a$. The joint or union of the sections is effected by first inserting the abutting ring $f$, then the packing ring or gasket $e$, and finally the pipe section $a$. When this section is screwed into the opposite section, the shoulder $g$, will be forced against the packing ring $e$, which in turn is forced against the abutting ring $f$, thereby compelling the metal in the packing ring to become packed snugly against the surrounding walls, and to form a perfectly tight joint and hermetical seal.

It is obvious that my invention could be changed in many slight ways that might suggest themselves to a skilled mechanic. Therefore I do not limit myself to the exact construction herein shown, but consider myself entitled to all such variations as come within the scope and spirit of my device.

Having thus described my invention, what I claim as new, and desire to secure by Letters Patent, is—

In combination with an internally threaded coupling sleeve provided with a removable abutting ring, an externally threaded pipe section provided with a plain extension adapted to enter said ring, and a packing ring or gasket interposed between said pipe and ring, in the manner and for the purposes described.

In testimony whereof I affix my signature in presence of two witnesses.

WILLIAM WALLACE SIMRELL.

Witnesses:
OTTO BUSS,
HENRY F. WOLF.